(12) United States Patent
Yamazaki

(10) Patent No.: US 10,731,383 B2
(45) Date of Patent: Aug. 4, 2020

(54) SYMMETRIC COHERENT OPTICAL MIXER

(71) Applicant: MACOM Technology Solutions Holdings, Inc., Lowell, MA (US)

(72) Inventor: Hiroyuki Yamazaki, Tokyo (JP)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 0 days.

(21) Appl. No.: 16/051,965

(22) Filed: Aug. 1, 2018

(65) Prior Publication Data

US 2020/0041726 A1 Feb. 6, 2020

(51) Int. Cl.
*G02B 6/28* (2006.01)
*E05B 63/00* (2006.01)
*E05B 47/06* (2006.01)
*E05B 17/22* (2006.01)
*E05C 3/24* (2006.01)
*E05B 65/00* (2006.01)
(Continued)

(52) U.S. Cl.
CPC ...... *E05B 63/0052* (2013.01); *E05B 15/0295* (2013.01); *E05B 17/22* (2013.01); *E05B 47/0004* (2013.01); *E05B 47/0607* (2013.01); *E05B 65/0021* (2013.01); *E05C 3/24* (2013.01); *E05B 2047/0074* (2013.01); *E05B 2047/0094* (2013.01); *G07C 9/00563* (2013.01); *Y10T 292/1046* (2015.04)

(58) Field of Classification Search
CPC .................................................. G02B 6/2813
See application file for complete search history.

(56) References Cited

U.S. PATENT DOCUMENTS 4,887,314 A * 12/1989 Carroll ................... H04B 10/61
398/204
8,649,643 B2 * 2/2014 Jeong ....................... G02B 6/12
385/39

(Continued)

OTHER PUBLICATIONS

Guan et al., Compact and low loss 90 degree optical hybrid on a silicon-on-insulator platform, Optics Express, V. 25, N. 23, Nov. 13, 2017 (Year: 2017).*

(Continued)

*Primary Examiner* — Peter Radkowski
(74) *Attorney, Agent, or Firm* — Faegre Drinker Biddle & Reath LLP

(57) ABSTRACT

Aspects of a symmetric coherent optical mixer are described. In one example, the coherent optical mixer includes a group of symmetric MMI couplers and a group of symmetric bend waveguides optically coupled between the MMI couplers. The group of symmetric MMI couplers can include an input for a local light reference signal, an input for a modulated light signal, and outputs for detection of data from the modulated light signal. The group of symmetric MMI couplers can include four MMI couplers, each of which comprises a 2×2 MMI coupler of symmetric dimension. The group of symmetric bend waveguides can include a symmetric layout of four 90° bend waveguides optically coupled between the four MMI couplers. The coherent optical mixer, which can be implemented as a Silicon Photonics (SiPh) device, provides better performance as a 90° degree optical hybrid than prior mixer devices due to its symmetric layout.

20 Claims, 5 Drawing Sheets

(51) Int. Cl.
*E05B 15/02* (2006.01)
*E05B 47/00* (2006.01)
*G07C 9/00* (2020.01)

(56) References Cited

U.S. PATENT DOCUMENTS

| | | | | |
|---|---|---|---|---|
| 8,971,677 B2* | 3/2015 | Sakamaki | .......... | G02B 6/12004 385/31 |
| 9,128,347 B2* | 9/2015 | Kato | ........... | G02F 1/225 |
| 2010/0054761 A1* | 3/2010 | Chen | ........... | H04B 10/60 398/212 |
| 2011/0064422 A1* | 3/2011 | Kim | ........... | G02B 6/12004 398/214 |
| 2011/0229069 A1* | 9/2011 | Bontempi | ........ | G02B 6/12004 385/3 |
| 2011/0229074 A1* | 9/2011 | Jeong | ........... | G02B 6/125 385/28 |
| 2011/0229075 A1* | 9/2011 | Watanabe | ......... | G02B 6/125 385/31 |
| 2012/0106984 A1* | 5/2012 | Jones | ........... | H04B 10/60 398/214 |
| 2012/0237154 A1* | 9/2012 | Jeong | ........... | G02B 6/12 385/1 |
| 2013/0236172 A1* | 9/2013 | Suzuki | .......... | H04B 10/612 398/43 |
| 2013/0279847 A1* | 10/2013 | Watanabe | ........ | G02B 6/125 385/24 |
| 2014/0086595 A1* | 3/2014 | Yamazaki | ........ | G02B 6/125 398/214 |
| 2015/0378098 A1* | 12/2015 | Matsumoto | ...... | G02B 6/1228 356/477 |

OTHER PUBLICATIONS

Hang Guan, et al., "Compact and low loss 90° optical hybrid on a silicon-on-insulator platform," Optics Express, vol. 25, No. 23 | Nov. 13, 2017.

* cited by examiner

SYMMETRIC COHERENT OPTICAL MIXER

BACKGROUND

The on/off-keying (OOK) modulation technique was sufficient for data rates up to about 10 Gb/s per channel in fiber optic communication systems. The capacity of such systems, particularly for long-haul communications, has also been increased by the introduction of wavelength multiplexing, dispersion compensation, error correction, and other advancements. However, to continue to extend the capacity of fiber optic communication systems, the use of new modulation techniques is necessary. The use of a phase shift keying (PSK) modulation technique, for example, rather than OOK modulation, can increase the data rates of fiber optic communication systems but requires more sophisticated detection and equalization techniques.

Non-coherent modulation techniques do not require a reference clock signal at the receiver that is phase synchronized with the carrier signal at the transmitter. Modulation symbols are asynchronously transferred in non-coherent systems, and OOK modulation is one example of a non-coherent modulation technique. On the other hand, coherent modulation techniques, such as PSK, rely upon a phase synchronized reference clock signal at the receiver to increase data rates.

The advantages of using coherent modulation techniques include the detection of quadrature and polarization modulated formats, linear correction, better filtering, and increased sensitivity. Both modulation and demodulation of data in various coherent formats can be performed using optical components combined with electronic digital signal processors, but require more sophisticated detection and equalization techniques. Coherent demodulation also relies upon relatively higher precision and symmetry in the optical devices used for demodulation, and it is particularly difficult to achieve precision and symmetry in smaller, integrated optical devices.

SUMMARY

According to one embodiment, an optical device for coherent demodulation is described. The optical device can be an optical mixer and includes a local input multimode interference (MMI) coupler comprising an input for a local light reference signal, a symmetric quadruple of MMI couplers, and a symmetric quadruple of bend waveguides optically coupled between the symmetric quadruple of MMI couplers. The symmetric quadruple of MMI couplers can include an input for an output of the local input MMI coupler, an input for a modulated light signal, and a plurality of outputs for detection of data from the modulated light signal. In one example, the optical device can be embodied as a symmetric optical coherent mixer device integrated as a Silicon Photonics (SiPh) device using semiconducting materials.

The local input MMI coupler can be embodied as a 1×2 MMI coupler, and the symmetric quadruple of MMI couplers can include a symmetric layout of four MMI couplers. Each of the four MMI couplers can be embodied as a 2×2 MMI coupler of symmetric configuration. A first MMI coupler among the four MMI couplers can receive an output of the local input MMI coupler as a local carrier wavelength for coherent demodulation. A second MMI coupler among the four MMI couplers can receive the modulated light signal. Additionally, a third MMI coupler among the four MMI couplers can include an in-phase output for detection of data from the modulated light signal, and a fourth MMI coupler among the four MMI couplers can include a quadrature output for detection of the data from the modulated light signal. The symmetric quadruple of bend waveguides can be embodied as a symmetric layout of four 90° bend waveguides, where each waveguide is optically coupled between a respective pair of the four MMI couplers.

In another embodiment, a method using an optical device or coherent demodulation is described. The method includes guiding a local light reference signal and a modulated light signal into a symmetric optical coherent mixer device. The symmetric optical coherent mixer device can include a symmetric quadruple of MMI couplers and a symmetric quadruple of bend waveguides optically coupled between the symmetric quadruple of MMI couplers. The method also includes coherently mixing the local light reference signal and the modulated light signal in the symmetric optical coherent mixer device to provide an in-phase output and a quadrature output. Among other steps, the method additionally includes guiding the in-phase output and the quadrature output from the symmetric quadruple of MMI couplers into at least one detector for detection of data from the modulated light signal.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
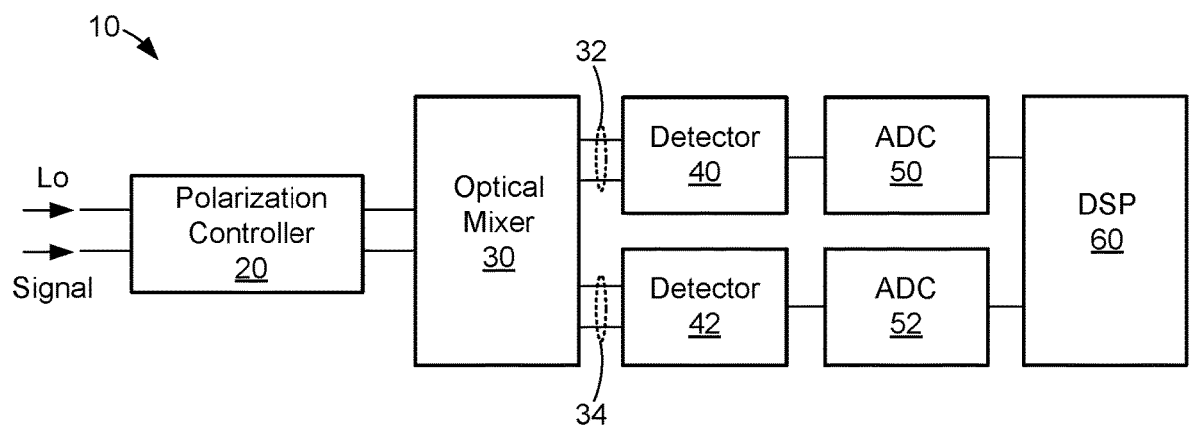
FIG. 1 illustrates part of an example coherent receiver system for optical communication according to various embodiments described herein.

Intensity modulation (IM) and on/off keying (OOK) modulation techniques have been used to convey data over channels using pulses of light in fiber optic communications systems using WDM, CWDM, and DWDM. In optical communications, IM is a form of modulation in which the optical power output of a light source is varied in accordance with some characteristic of the modulating signal, such as data values, and OOK modulation follows a similar approach. The IM modulation technique has a significant advantage in that receiver sensitivity is not dependent upon the phase of the carrier or on the state of polarization (SOP) of the incoming signal, which randomly fluctuates in practice. These modulation techniques have proven to be suitable for relatively low throughput, short distance optical communications.

The capacity of fiber optic communication systems, particularly for long-haul communications, has been increased by the introduction of wavelength multiplexing, dispersion compensation, error correction, and other advancements. Additionally, other modulation techniques besides IM and OOK can be relied upon to further increase the throughput and signal-to-noise ratio of data transfer in fiber optical communications systems.

For higher bandwidth transmissions, higher-order, coherent modulation schemes can be relied upon. Examples of higher-order modulation schemes include optical duobinary (ODB), quadrature phase shift keying (QPSK), differential phase shift keying (DPSK), dual polarization quadrature phase shift keying (DP-QPSK), and other schemes. Thus, the use of a phase shift keying (PSK) modulation technique can increase the data rates of fiber optic communication systems as compared to IM and OOK modulation.

However, wavelength and phase control are particularly important for coherent modulation schemes, and coherent modulation schemes can also depend upon more sophisticated detection and equalization techniques. In a coherent receiver, a modulated light signal is interfered with a local light reference signal to extract the phase information from the modulated light signal. Heterodyne and homodyne receivers are examples of coherent receivers. Coherent receivers are more sensitive to random variations in the phase and SOP of the incoming signal. To address these problems, the configuration of coherent systems is relatively more complicated than those that rely upon IM and OOK modulation techniques.

In Silicon Photonics (SiPh), optical devices can be integrated with electronic components using semiconducting materials and semiconductor manufacturing techniques. Among other uses, SiPh devices can be relied upon to communicate data between optical transmitters and receivers. In an optical transmitter, data is used to modulate light, such as that produced by a light or laser emitting diode, and the modulated light can be transmitted to an optical receiver over optical waveguides, fiber optic cables, etc. Modulated light streams (e.g., optical data streams) are more suitable for long distance, low loss data transmission as compared to data transmitted in the electrical domain. Before (and still after) the integration of optical components in SiPh integrated circuits, bulk (e.g., discrete) components were used in optical communications systems. As industry trends continue toward lower power, smaller size, and higher bandwidth optical communications, however, there is a need to form and integrate optical mixers into SiPh integrated circuits to reduce the size and cost of optical coherent receivers.

In the context outlined above, symmetric coherent optical mixers for use in optical coherent receivers are described. In one example, a coherent optical mixer includes a group of symmetric multimode interference (MMI) couplers and a group of symmetric bend waveguides optically coupled between the MMI couplers. The group of symmetric MMI couplers can include an input for a local light reference signal, an input for a modulated light signal, and outputs for the detection of data from the modulated light signal. The group of symmetric MMI couplers can include four MMI couplers, each of which comprises a 2×2 MMI coupler of symmetric dimension. The group of symmetric bend waveguides can include a symmetric layout of four 90° bend waveguides optically coupled between the four MMI couplers. The coherent optical mixer, which can be implemented as a Silicon Photonics (SiPh) device, provides better performance as a 90° degree optical hybrid than prior mixer devices due to its symmetric layout.

Turning to the drawings, FIG. 1 illustrates part of an example coherent receiver system 10 ("receiver system 10") for optical communication according to various embodiments described herein. The receiver system 10 is provided as one example of a coherent receiver for fiber optic communications. The components of the receiver system 10, as shown in FIG. 1, are not exhaustive, and similar systems can include other components not shown in FIG. 1. Additionally, similar systems can omit one or more of the elements shown in FIG. 1.

As shown, the receiver system 10 comprises a polarization controller 20, an optical mixer 30, detectors 40 and 42, analog-to-digital converters (ADCs) 50 and 52, and a digital signal processor 60. The polarization controller 20 receives a local light reference signal ("Lo") and a modulated light signal ("Signal") as inputs. The polarization controller 20 can be embodied as an optical device designed to modify the polarization states of one or both of the modulated light signal and the local light reference signal. Particularly, the polarization controller 20 is configured to align the state of polarization (SOP) of the modulated light signal and the local light reference signal before outputting them to the optical mixer 30.

Figure 2:
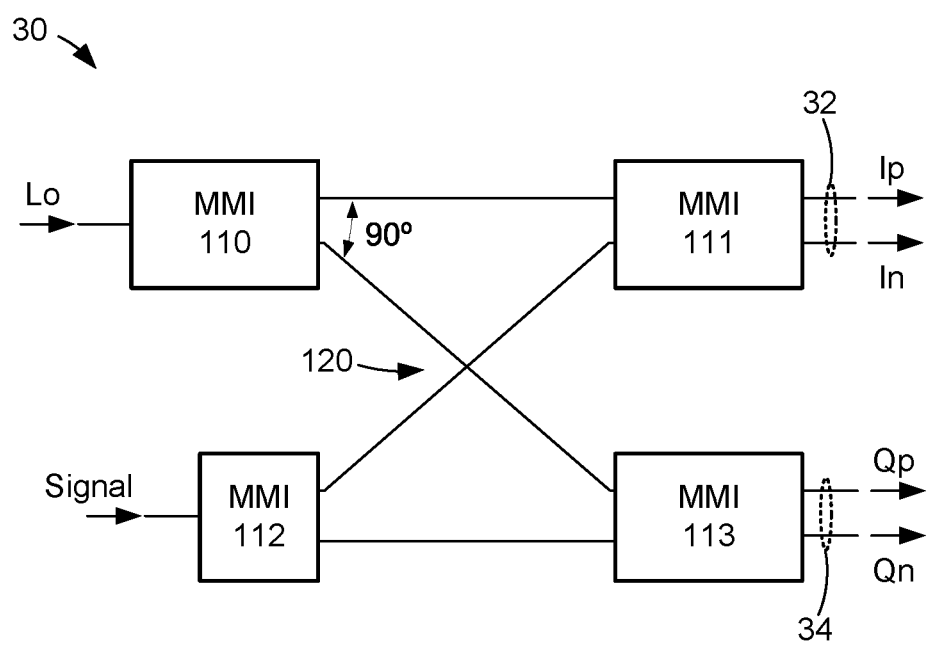
FIG. 2 illustrates an example optical mixer that can be used in the receiver system shown in FIG. 1 according to various embodiments described herein.
Figure 3:
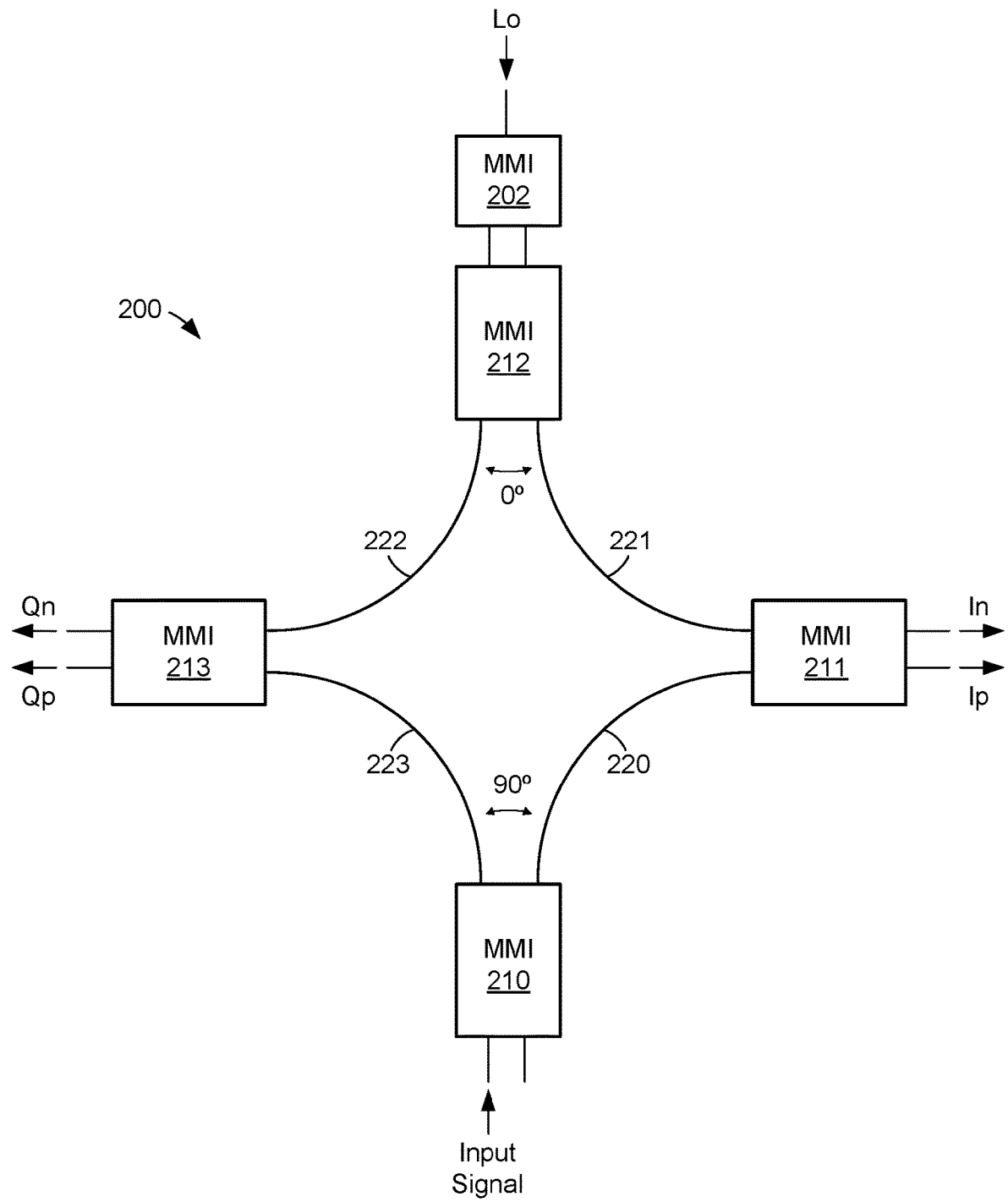
FIG. 3 illustrates an example symmetric optical mixer that can be used in the receiver system shown in FIG. 1 according to various embodiments described herein.

After alignment by the polarization controller 20, the modulated light signal and the local light reference signal are optically coupled into the optical mixer 30. As one example, the optical mixer 30 can be embodied as a type of coherent optical mixer, including an arrangement of optical dividers or splitters, optical combiners, and at least one phase shifter. More particular examples of the optical mixer 30 are illustrated in FIGS. 2 and 3 and described in further detail below.

The optical mixer 30 is configured to mix the modulated light signal and the local light reference signal together. In the optical mixer 30, the modulated light signal and the local light reference signal are combined to provide, as outputs, four different vectorial combinations of the modulated light signal and the local light reference signal. For optical coherent detection, the optical mixer 30 can mix the modulated light signal with the four quadratural states of the local light reference signal in the complex-field space. The outputs of the optical mixer 30 include the phase diversity in-phase outputs 32 and the phase diversity quadrature outputs 34, as shown in FIG. 1. The in-phase outputs 32 are provided to the detector 40, and the quadrature outputs are provided to the detector 42.

The detectors 40 and 42 can be embodied as balanced detectors, including a pair of photodiodes, for example. Based on the in-phase outputs 32, the detector 40 can output an in-phase electric signal representative of the in-phase component of the information (e.g., data) in the modulated light signal ("Signal") input, over time. Similarly, based on the quadrature outputs 34, the detector 42 can output a quadrature electric signal representative of the quadrature component of the information in the modulated light signal input, over time. The signals output by the detectors 40 and 42 are provided to the ADCs 50 and 52, respectively.

The ADC 50 converts the analog in-phase output signal from the detector 40 into a digital in-phase output signal for the DSP 60. Similarly, the ADC 52 converts the analog quadrature output signal from the detector 42 into a digital quadrature output signal for the DSP 60. The ADCs 50 and 52 can be embodied as any suitable type of analog-to-digital converters. The digital in-phase and quadrature output signals from the ADCs 50 and 52, respectively, can be relied upon to capture the information (e.g., data) in the modulated light signal ("Signal") input.

The DSP 60 can be embodied as a digital signal processing device, including memory. The DSP 60 can be configured to filter, measure, and analyze the digital quadrature and in-phase output signals from the ADCs 50 and 52 through the application of one or more baseband signal processing algorithms. Through the baseband signal processing algorithms, the amplitudes and phases of the digital in-phase and quadrature output signals can be measured, processed, and combined, over time, to determine the data in the modulated light signal received by the receiver system 10.

FIG. 2 illustrates an example of the optical mixer 30 in the receiver system 10 shown in FIG. 1. Optical mixers similar to the optical mixer 30 are relied upon in many applications of optical communications, including homodyne and heterodyne optical receivers in both phase-locked and phase-diversity configurations. The optical mixer 30 shown in FIG. 2 a six-port optical device with two inputs and four outputs.

As shown in FIG. 2, the optical mixer 30 includes a group of MMI couplers 110-113 optically interconnected by a number of waveguides 120 between them. The optical mixer 30 is one example of (or includes) a 90° optical hybrid. 90° optical hybrids can be implemented using various types and configurations of optical elements, including using arrayed waveguide gratings with chirped waveguides, cascaded Mach-Zehnder interferometers, and MMIs, among other configurations.

The MMI coupler 110 provides phase-shifted versions of the local light reference signal ("Lo") as outputs. The outputs of the MMI coupler 110 can be shifted in phase by 90° as compared to each other. The outputs of the MMI coupler 110 are provided to the MMI couplers 111 and 113 for mixing with the outputs of the MMI coupler 112. The MMI 112 provides split portions of the modulated light signal ("Signal") as outputs. Ideally, the outputs of the MMI coupler 112 are not shifted in phase as compared to each other. The outputs of the MMI coupler 112 are provided to the MMI couplers 111 and 113 for mixing with the outputs of the MMI coupler 110. The MMI coupler 111 outputs the in-phase outputs 32 (i.e., In and Ip), and the MMI coupler 113 outputs the phase diversity quadrature outputs 34 (i.e., Qn and Qp).

Based on the local light reference signal, the optical mixer 30 applies a different phase change to the modulated light signal at each of the outputs, to provide the in-phase outputs 32 (i.e., In and Ip) and the quadrature outputs 34 (i.e., Qn and Qp). The fixed wavelength of the local light reference ensures that these phase changes are fixed at the carrier wavelength of the modulated light signal. Ideally, if the phase differences between pairs of the outputs (i.e., In and Ip, Qn and Qp) were 180°, balanced detection could be used to eliminate any DC component. However, the design of the MMI coupler 110 leads to varied, unbalanced, or non-uniform phase differences among the in-phase outputs 32 and the quadrature outputs 34. These non-uniform phase differences are caused, in part, by process errors in manufacturing and the asymmetric layout of the optical mixer 30.

To overcome the non-uniform phase differences among the in-phase outputs 32 and the quadrature outputs 34 in the optical mixer 30, the embodiments described herein are directed to new types of symmetric coherent optical mixers for use in optical coherent receivers. FIG. 3 illustrates an example symmetric optical mixer 200 that can be used in the receiver system 10 shown in FIG. 1. The optical mixer 200 is provided as one example of a symmetric optical mixer device according to the concepts described herein. The concepts are not limited to the design shown in FIG. 3 but can be applied to other designs.

The optical mixer 200 includes a local input MMI coupler 202, a symmetric quadruple of MMI couplers 210-213, and a symmetric quadruple of bend waveguides 220-223 optically coupled between the symmetric quadruple of MMI couplers 210-213. In one example, the optical mixer 200 can be embodied as a SiPh optical device, integrated on a substrate material using semiconducting materials and semiconductor manufacturing techniques.

As shown in FIG. 3, the local input MMI coupler 202 comprises a one (1) input, two (2) output (1×2) MMI coupler, and each of the MMI couplers 210-213 comprises a two (2) input, two (2) output (2×2) MMI coupler. For symmetry, each of the MMI couplers 210-213 can preferably be formed to be the same size and configuration. The MMI couplers 202 and 210-213 can be embodied as passive components integrated in the optical mixer 200. Light guided into the inputs of the MMI couplers 202 and 210-213 is allowed to propagate and interfere with itself, constructively and/or destructively, within the MMI couplers 202 and 210-213. Based on the manner in which the light propagates and interferes with itself, output light is provided at the outputs of the MMI couplers 202 and 210-213.

The bend waveguides 220-223 can be embodied as optical waveguides integrated in the optical mixer 200. Optical waveguides are structures that guide electromagnetic waves or signals in the optical spectrum (e.g., light). Optical waveguides can be categorized according to their size, shape, and structure (e.g., planar, strip, or fiber waveguides), mode (e.g., single-mode, multi-mode), refractive index distribution (e.g., step or gradient index), and material (e.g., glass, polymer, semiconductor).

Any suitable optical waveguides can be used for the bend waveguides 220-223 in the optical mixer 200. For symmetry in the optical mixer 200, the bend waveguides 220-223 can preferably be formed of the same materials to have the same refractive index, the same type (e.g., rib-type, wire-type, etc.), the same size (e.g., length, width, height), and the same shape (e.g., bend characteristics). As shown in FIG. 3, each of the bend waveguides 220-223 can exhibit a 90° bend, to maintain the symmetry among the quadruple of MMI couplers 210-213. Because the refractive indexes of the bend waveguides 220-223 may change based on temperature or when heated, the optical mixer 200 can include one or more heaters in some cases to maintain a consistent temperature among the bend waveguides 220-223.

As shown in FIG. 3, the MMI coupler 210 receives the modulated light signal ("Signal") as an input signal. The MMI coupler 212 receives the local light reference signal ("Lo") as an input signal. The MMI coupler 211 outputs the in-phase outputs In and Ip, and the MMI coupler 213 outputs the quadrature outputs Qn and Qp. Further, the bend waveguide 220 includes an input coupled to a first output of the MMI coupler 210 and an output coupled to a first input of the MMI coupler 211. The bend waveguide 223 includes an input coupled to a second output of the MMI coupler 210 and an output coupled to a first input of the MMI coupler 213. The bend waveguide 221 includes an input coupled to a first output of the MMI coupler 212 and an output coupled to a second input of the MMI coupler 211. The bend waveguide 222 includes an input coupled to a second output of the MMI coupler 212 and an output coupled to a second input of the MMI coupler 213.

Based on the design and layout of the optical mixer 200, the outputs of the MMI 212 can have no (or nearly 0°) phase difference between them, and the outputs of the MMI 210 can have a 90° (or nearly 90°) phase difference between them, as shown in FIG. 3. Further, the outputs of the MMI 213 can have a 180° (or nearly 180°) phase difference between them, and the outputs of the MMI 211 can have a 180° (or nearly 180°) phase difference between them.

Figure 4:
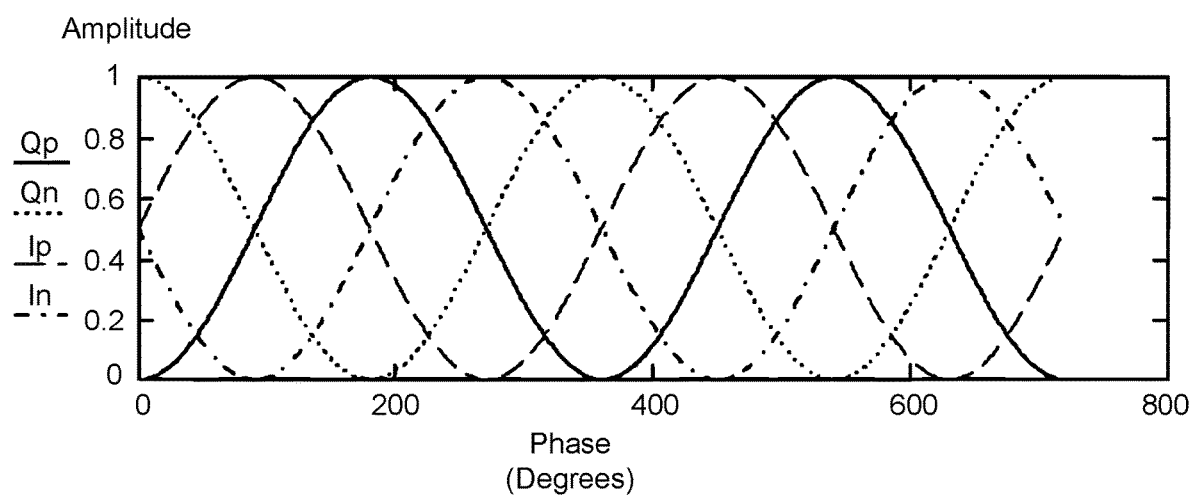
FIG. 4 illustrates an example of the outputs of the symmetric optical mixer shown in FIG. 3 according to various embodiments described herein.

FIG. 4 illustrates an example of the outputs of the symmetric optical mixer 200 shown in FIG. 3. As shown, the phase difference between the Qn and Qp outputs of the MMI 213 can have a 180° (or nearly 180°) phase difference between them, and the In and Ip outputs of the MMI 211 can have a 180° (or nearly 180°) phase difference between them. Thus, if used in place of the optical mixer 30 shown in FIG. 1, the outputs of the optical mixer 200 shown in FIG. 3 are suitable for balanced detection by the detectors 40 and 42 to eliminate any DC component during demodulation in the DSP 60.

The outputs Qp, Qn, Ip, and In can, theoretically, be defined according to Equations (1)-(4) below.

$$Q_p(x) = \frac{\left(\left|\exp\left(j\frac{\pi}{180}x\right) + \exp(j\pi)\right|\right)^2}{4} \quad (1)$$

$$Q_n(x) = \frac{\left(\left|\exp\left(j\frac{\pi}{2}\right) + \exp\left(j\frac{\pi}{180}x + j\frac{\pi}{2}\right)\right|\right)^2}{4} \quad (2)$$

$$I_p(x) = \frac{\left(\left|\exp\left(j\frac{\pi}{180}x\right) + \exp\left(j\frac{\pi}{2}\right)\right|\right)^2}{4} \quad (3)$$

$$I_n(x) = \frac{\left(\left|\exp\left(j\frac{\pi}{180}x + j\frac{\pi}{2}\right) + \exp(j0)\right|\right)^2}{4} \quad (4)$$

Figure 5:
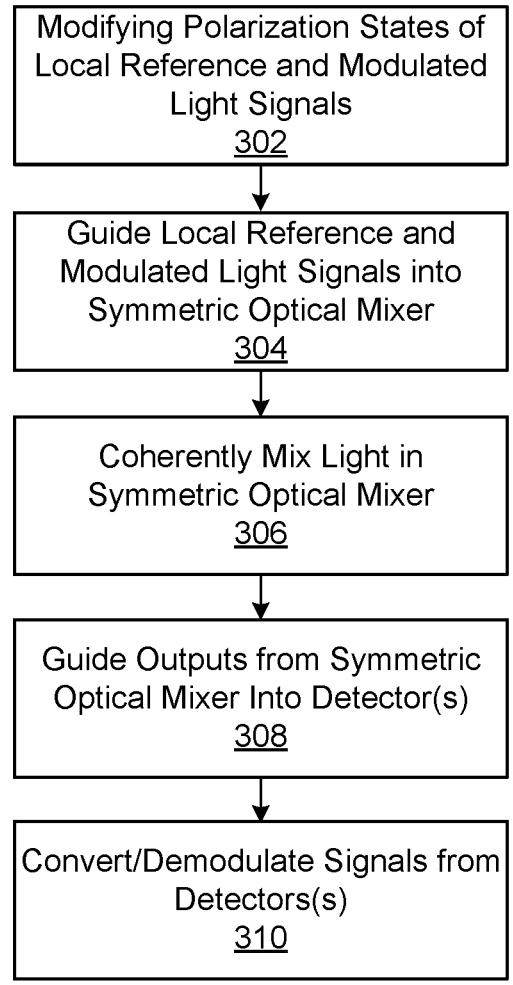
FIG. 5 illustrates an example symmetric optical hybrid method according to various embodiments described herein.

FIG. 5 illustrates an example symmetric optical hybrid method according to various embodiments described herein. The process diagram shown in FIG. 5 provides one example of a sequence of steps according to the concepts described herein. The arrangement of the steps shown in FIG. 5 is provided by way of representative example. In other embodiments, the order of the steps can differ from that depicted. For example, an order of execution of two or more of the steps can be scrambled relative to the order shown. Also, in some cases, two or more of the steps can be performed concurrently or with partial concurrence. Further, in some cases, one or more of the steps can be skipped or omitted. Additionally, although the process is described in connection with symmetric optical mixer 200 shown in FIG. 3 and the receiver system 10 shown in FIG. 1, other structures can be used to perform the process.

At step 302, the process can include the polarization controller 20 receiving and modifying the polarization states of a local light reference signal ("Lo") and a modulated light signal ("Signal"), which are supplied as inputs. The local light reference signal can be a carrier signal at a particular wavelength for coherent demodulation. The modulated light signal can include a carrier wave modulated by data according to a PSK or other modulation technique that relies upon coherent demodulation.

At step 304, the process can include guiding a local light reference signal ("Lo") and a modulated light signal ("Signal") into a symmetric optical coherent mixer device, such as the symmetric optical mixer 200. The symmetric optical coherent mixer device can include a symmetric quadruple of MMI couplers, such as the MMI couplers 210-213, and a symmetric quadruple of bend waveguides, such as the bend waveguides 220-223, optically coupled between the symmetric quadruple of MMI couplers. In one example, the light reference signal can be provided to the MMI coupler 202 before being input to the MMI coupler 212.

At step 306, the process can include coherently mixing the local light reference signal and the modulated light signal in the symmetric optical coherent mixer device to provide an in-phase output and a quadrature output. For example, the local light reference signal and the modulated light signal can be mixed together in the MMI couplers 210-213 to provide the Qn and Qp quadrature outputs of the MMI 213 and the In and Ip in-phase outputs of the MMI 211 as described above.

At step 308, the process can include guiding the in-phase output and the quadrature output from the symmetric quadruple of MMI couplers into at least one detector for detection of data from the modulated light signal. For example, the In and Ip in-phase outputs of the MMI 211 can be provided to the detector 40, and the Qn and Qp quadrature outputs of the MMI 213 can be provided to the detector 42. Based on the In and Ip in-phase outputs, the detector 40 can output an in-phase electric signal representative of the in-phase component of the information (e.g., data) in the modulated light signal. Similarly, based on the Qn and Qp quadrature outputs, the detector 42 can output a quadrature electric signal representative of the quadrature component of the information in the modulated light signal.

At step 310, the process can include converting and demodulating the signals from the detectors 40 and 42 into digital quadrature and in-phase output signals. The signals output by the detectors 40 and 42 can be provided to the ADCs 50 and 52, respectively, which provide digital outputs to the DSP 60. In turn, the DSP 60 can filter, measure, and analyze the digital quadrature and in-phase output signals from the ADCs 50 and 52 through the application of one or more baseband signal processing algorithms. Through the baseband signal processing algorithms, the amplitudes and phases of the digital in-phase and quadrature output signals can be measured, processed, and combined, to determine the data in the modulated light signal received at step 302.

The receiver system 10 can include at least one processing circuit, such as the DSP 60, and at least one memory or memory device. The processing circuit can include one or more processors and be coupled to the memory device via a local interface. The memory can store computer-readable instructions executable by one or processors of the processing circuit. Thus, in part, receiver system 10 can be embodied in the form of hardware, as software components that are executable by hardware, or as a combination of software and hardware.

The DSP 60 can include one or more processors or microprocessors for implementing various logic functions upon an application of one or more data signals. The DSP 60 can, additionally or alternatively, be embodied as discrete logic circuits having logic gates, ASICs having appropriate logic gates, and/or programmable logic devices (e.g., field-programmable gate array (FPGAs), complex programmable logic devices (CPLDs), etc.).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following clauses, the scope of which are to be accorded the broadest interpretation so as to encompass modifications and equivalent structures.

The invention claimed is:

1. An optical device, comprising:
    a local input multimode interference (MMI) coupler comprising an input for a local light reference signal;
    a symmetric quadruple of MMI couplers, the symmetric quadruple of MMI couplers comprising an input for an output of the local input MMI coupler, an input for a modulated light signal, and a plurality of outputs for detection of data from the modulated light signal; and
    a symmetric quadruple of bend waveguides optically coupled between the symmetric quadruple of MMI couplers.

2. The optical device of claim 1, wherein the optical device comprises a symmetric optical coherent mixer device.

3. The optical device of claim 1, wherein the optical device is integrated using semiconducting materials as a Silicon Photonics (SiPh) device.

4. The optical device of claim 1, wherein the local input MMI coupler comprises a 1×2 MMI coupler.

5. The optical device of claim 1, wherein:
    the symmetric quadruple of MMI couplers comprises a symmetric layout of four MMI couplers;
    a first MMI coupler among the four MMI couplers comprises the input for the output of the local input MMI coupler; and
    a second MMI coupler among the four MMI couplers comprises the input for the modulated light signal.

6. The optical device of claim 5, wherein each of the four MMI couplers comprises a 2×2 MMI coupler of symmetric dimension.

7. The optical device of claim 5, wherein:
    no phase difference is exhibited at outputs of the first MMI coupler; and
    a 90° phase difference is exhibited at outputs of the second MMI coupler.

8. The optical device of claim 5, wherein:
    a third MMI coupler among the four MMI couplers comprises an in-phase output for detection of the data from the modulated light signal; and
    a fourth MMI coupler among the four MMI couplers comprises a quadrature output for detection of the data from the modulated light signal.

9. The optical device of claim 8, wherein:
    the symmetric quadruple of bend waveguides comprises a symmetric layout of four 90° bend waveguides; and
    each waveguide among the four 90° bend waveguides is optically coupled between a respective pair of the four MMI couplers.

10. An optical device, comprising:
    a local input multimode interference (MMI) coupler;
    a symmetric quadruple of multimode interference (MMI) couplers, the symmetric quadruple of MMI couplers comprising an input optically coupled to an output of the local input MMI coupler, an input for a modulated light signal, and a plurality of outputs for detection of data from the modulated light signal; and
    a symmetric quadruple of bend waveguides optically coupled between the symmetric quadruple of MMI couplers.

11. The optical device of claim 10, wherein the optical device comprises a symmetric optical coherent mixer device.

12. The optical device of claim 10, wherein:
    the symmetric quadruple of MMI couplers comprises a symmetric layout of four MMI couplers;
    a first MMI coupler among the four MMI couplers comprises the input optically coupled to an output of the local input MMI coupler; and
    a second MMI coupler among the four MMI couplers comprises the input for the modulated light signal.

13. The optical device of claim 12, wherein each of the four MMI couplers comprises a 2×2 MMI coupler of symmetric dimension.

14. The optical device of claim 12, wherein:
    a third MMI coupler among the four MMI couplers comprises an in-phase output for detection of the data from the modulated light signal; and
    a fourth MMI coupler among the four MMI couplers comprises a quadrature output for detection of the data from the modulated light signal.

15. The optical device of claim 14, wherein:
    the symmetric quadruple of bend waveguides comprises a symmetric layout of four 90° bend waveguides; and
    each waveguide among the four 90° bend waveguides is optically coupled between a respective pair of the four MMI couplers.

16. A Silicon Photonics (SiPh) optical device, comprising:
    a 1×2 multimode interference (MMI) coupler comprising an input for a local light reference signal;
    a symmetric quadruple of MMI couplers comprising a pair of inputs optically coupled to a pair of outputs from the 1×2 MMI coupler, an input for a modulated light signal, and a plurality of outputs for detection of data from the modulated light signal; and
    symmetric waveguides optically coupled between the symmetric quadruple of MMI couplers.

17. The SiPh optical device of claim 16, wherein the symmetric quadruple of MMI couplers comprises a symmetric layout of four MMI couplers.

18. The SiPh optical device of claim 17, wherein each of the four MMI couplers comprises a 2×2 MMI coupler of symmetric dimension.

19. The SiPh optical device of claim 17, wherein:
    no phase difference is exhibited at outputs of a first MMI coupler among the four MMI couplers; and
    a 90° phase difference is exhibited at outputs of a second MMI coupler among the four MMI couplers.

20. The SiPh optical device of claim 19 wherein:
    a third MMI coupler among the four MMI couplers comprises an in-phase output for detection of the data from the modulated light signal; and
    a fourth MMI coupler among the four MMI couplers comprises a quadrature output for detection of the data from the modulated light signal.

* * * * *